(12) United States Patent
Hara et al.

(10) Patent No.: US 6,600,243 B1
(45) Date of Patent: Jul. 29, 2003

(54) BATTERY PACK AND AN INFORMATION PROCESSING DEVICE IN WHICH THE BATTERY PACK IS DETACHABLE/ATTACHABLE

(75) Inventors: Tsutomu Hara, Fujisawa (JP); Mariko Kasai, Ebina (JP); Hitoshi Yokota, Kawasaki (JP); Giichirou Yokokura, Ebina (JP); Nobuhiro Kato, Ebina (JP); Tatsuhiko Matsuoka, Ebina (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/493,807

(22) Filed: Jan. 28, 2000

(30) Foreign Application Priority Data

Apr. 26, 1999 (JP) .......................... 11-117663
Oct. 19, 1999 (JP) .......................... 11-296256

(51) Int. Cl.⁷ .................................. H02J 9/00
(52) U.S. Cl. .................. 307/150; 307/89; 307/91; 307/147; 307/149; 361/143
(58) Field of Search .................. 307/150, 91, 89, 307/147, 149; 361/143

(56) References Cited

U.S. PATENT DOCUMENTS

| | | | | |
|---|---|---|---|---|
| 4,668,873 A | * | 5/1987 | Ohba et al. ................. | 307/9.1 |
| 5,227,805 A | * | 7/1993 | King et al. ................. | 343/702 |
| 5,517,069 A | * | 5/1996 | Zibrik et al. ................. | 307/91 |
| 5,912,597 A | * | 6/1999 | Inagawa et al. ................. | 333/1 |
| 6,013,957 A | * | 1/2000 | Puzo et al. ................. | 307/91 |
| 6,175,624 B1 | * | 1/2001 | Brundieck et al. ................. | 379/433 |
| 6,376,931 B1 | * | 4/2002 | Kim ................. | 307/64 |

FOREIGN PATENT DOCUMENTS

| | | | | |
|---|---|---|---|---|
| FR | WO 96/08863 | * | 3/1996 | ........... H02M/1/12 |
| JP | 5-143192 | | 6/1993 | |

* cited by examiner

*Primary Examiner*—Brian Sircus
*Assistant Examiner*—Robert L DeBeradinis
(74) *Attorney, Agent, or Firm*—Mattingly, Stanger & Malur, P.C.

(57) ABSTRACT

The objective of the present invention is to provide an information processing device that is operable by a battery and which suppresses the generation of standing waves and has little radiation noise. In the information processing device of the present invention having means for connecting to a battery pack that stores a battery for supplying power to the information processing device, there is one or more capacitive element (for example, a capacitor) in the proximity of the terminals of the positive and negative poles of the battery when the battery pack is connected to the information processing device, and it is possible for at least the terminal of the positive pole of the battery or the terminal of the negative pole of the battery to be connected electrically to the ground of the information processing device by way of this capacitive element.

14 Claims, 13 Drawing Sheets

BATTERY PACK NOT GROUNDED (CONVENTIONAL METHOD)

FIG.20B

BOTH ENDS OF BATTERY PACK GROUNDED
(PRESENT INVENTION): HORIZONTALLY-POLARIZED WAVE

BATTERY PACK AND AN INFORMATION PROCESSING DEVICE IN WHICH THE BATTERY PACK IS DETACHABLE/ ATTACHABLE

BACKGROUND OF THE INVENTION

1. Field of the Invention

This invention relates to an information processing device that is capable of being operated by battery, and in more particular, to the mounting and power-supply configuration of the battery for a notebook type personal computer.

2. Description of Related Art

There are notebook type personal computers that are used, for example, as in the case of the notebook type computer device disclosed in Japanese Patent Application Publication Heisei 5-143192, wherein a battery pack of rechargeable secondary batteries (hereafter called batteries) is mounted in the main body. In many cases the battery pack is detachable/attachable from the notebook computer, and in order to avoid being partially inserted due to mishandling by the operator such that only the positive or negative power-supply wire is connected, the distance between the two power-supply terminals is made as short as possible when it is connected to the notebook PC.

SUMMARY OF THE INVENTION

Figure 12:
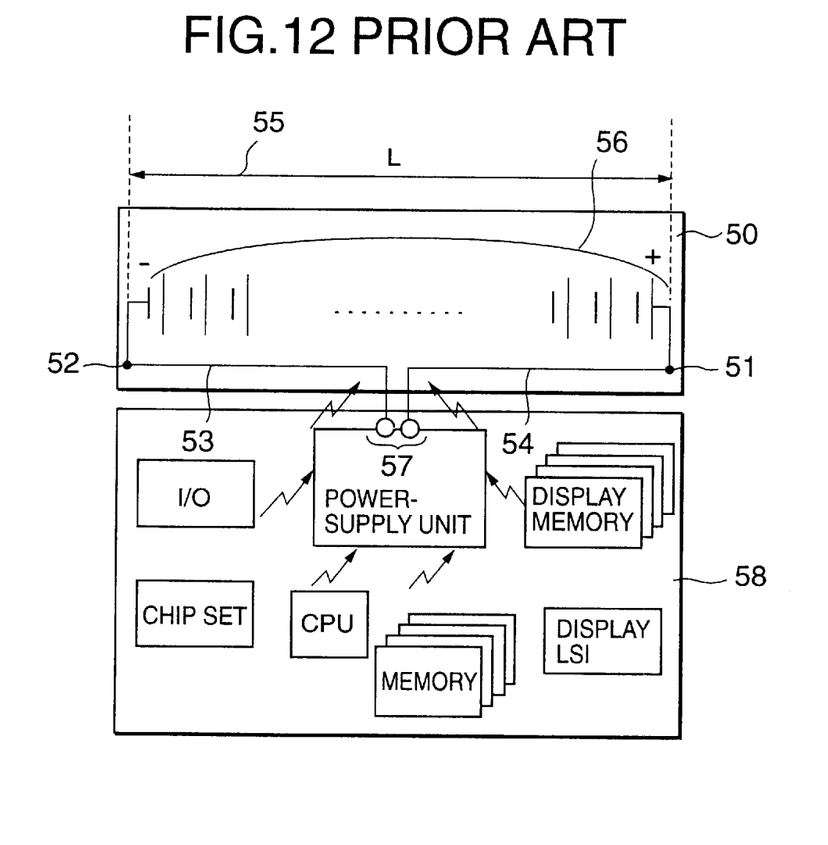
FIG. 12 is a drawing which explains the problems to be solved.

As shown in FIG. 12, if the battery pack 50, as described above, contains batteries with a negative terminal on the opposite side of the positive terminal, positive 54 and negative 53 power-supply wires must run from both ends of the battery 56.

Figure 13:
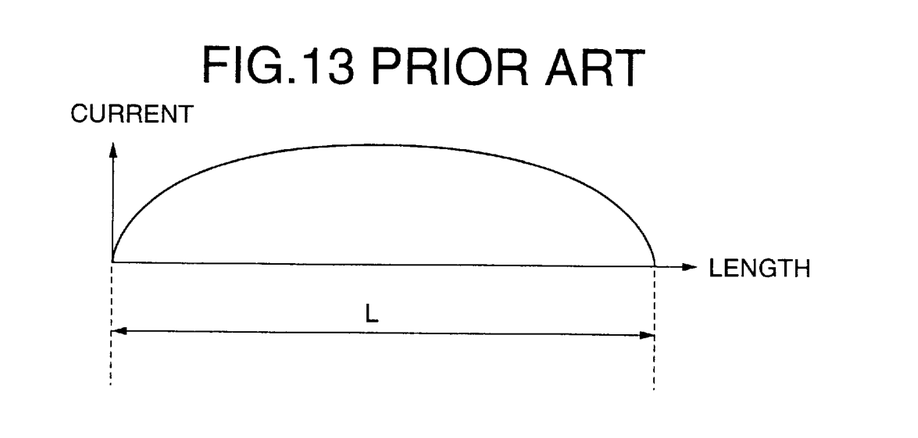
FIG. 13 shows the current distribution of the power-supply wires.

In the case of this kind of construction, the impedance from the supply terminal 57 for supplying current to the notebook PC to the battery terminals 51, 52 is a minimum at the supply terminal 57, and is a maximum at the battery terminals 51, 52. Therefore, if noise generated from the LSI or signal wires in the notebook PC 58 is transferred as high-frequency current to the power-supply wires 53, 54 in the battery pack, reflection occurs at the battery terminals 51, 52, and by superimposing the reflected waves with the incident waves, a standing wave, whose wavelength is equal to double the length of the power-supply wire L55, is generated (see FIG. 13). Therefore, the power-supply wires 53, 54 act as an antenna and make it easy to radiate noise to the outside.

The object of this invention is to provide an information processing device that is operable with battery which has little radiation noise and which suppresses the generation of standing waves.

In order to accomplish the aforementioned object, the present invention provides, in an information processing device with means which connects to a battery pack that stores a battery for supplying power to the information processing device, for example, at least one capacitive element (for example a capacitor) mounted in the proximity of the terminals of the positive and negative poles of the battery when the battery pack is connected to the information processing device. At least the terminal of the positive pole of the battery or the terminal of the negative pole of the battery may be connected electrically to the ground of the information processing device through this capacitive element. Here, what is meant by proximity is, for example, between the positive or negative pole and the terminal, or between the positive or negative pole of the battery and the circuit first connected by the battery.

It is also possible to connect the terminal of the negative pole of the battery to the ground of the information processing device without the capacitive element.

In addition, this invention provides a battery pack comprising means in the proximity of at least the positive terminal or negative terminal of the battery for connecting electrically the positive terminal or negative terminal of the battery to the ground of the information processing device.

It is possible to provide a capacitive element between the terminal of the positive pole of the battery and the terminal of the negative pole of the battery, and to connect the terminal of the positive pole and the terminal of the negative pole of the battery through the capacitive element.

Moreover, the present invention provides, for example, an information processing device comprising at least one capacitive element and at least one of means which connects electrically between the capacitive element and the terminal of the positive pole of the battery or the terminal of the negative pole of the battery, wherein the capacitive element connects electrically to ground.

Here, the means which connects electrically to the terminal of the negative pole of the battery can be connected electrically to ground without the capacitive element.

Moreover, the present invention provides, for example, a battery pack comprising capacitive elements and means provided in the proximity of the terminal of the positive pole of the battery and terminal of the negative pole of the battery, respectively, for connecting the capacitive elements and the ground of the information processing device, wherein the terminal of the positive pole of the battery and the terminal of the negative pole of the batter are connected electrically to ground through the capacitive elements provided in the proximity of the terminal of the positive pole of the battery and terminal of the negative pole of the battery, respectively.

Here, it is also possible to connect the terminal of the negative pole of the battery to ground without the capacitive element.

The present invention also provides a battery, for example, comprising a capacitive element wherein the positive pole and the negative pole of the battery are connected electrically through the capacitive element.

Moreover, the present invention provides an information processing device, for example, comprising a ground connector provided between both ends of the battery pack and the connector which electrically connects the positive pole and negative pole of the battery.

Furthermore, this invention provides an information processing device, for example, comprising a ground connector located between both ends of the battery pack and the connector which electrically connects the positive pole and negative pole of the battery and within a distance of ¼ or preferably ⅕ the length of the battery pack from the both ends of the substrate of the battery pack.

DETAILED DESCRIPTION OF THE PREFERRED EMBODIMENTS

Figure 1:
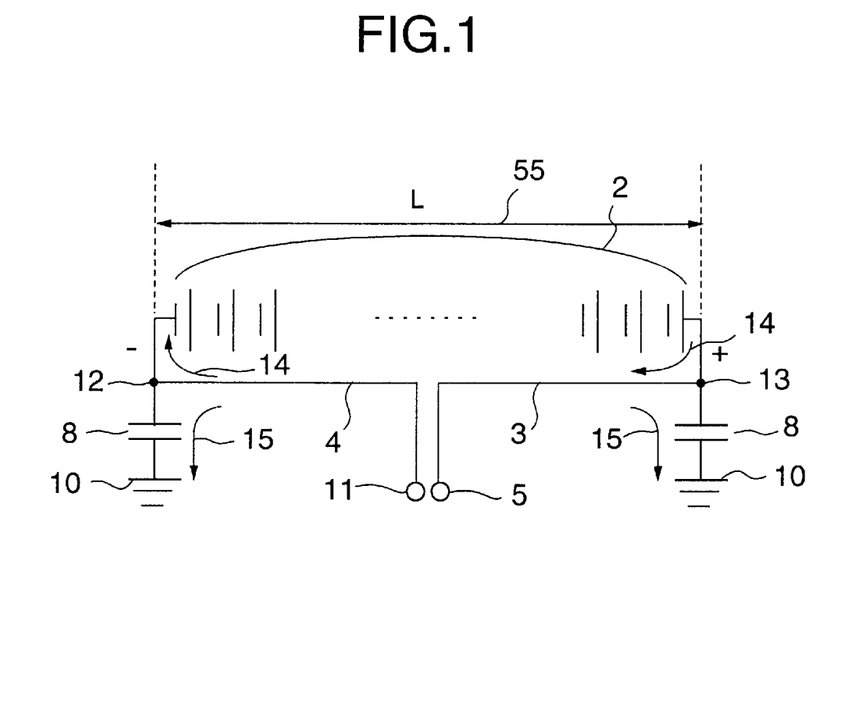
FIG. 1 is a drawing which explains a first embodiment of the present invention.

The preferred embodiments of the present invention will be explained with reference to the drawings. FIG. 1 shows a first embodiment of the present invention. The circuit in the drawing comprises a battery 2, a negative terminal 12 of the battery 2, a positive terminal 13 of the battery 2, a power-supply wire (+) 3 which runs from the positive terminal 13 of the battery, a power-supply wire (−) 4 which runs from the negative terminal 12 of the battery, and power-supply terminals (+) 5, (−) 11 for supplying current from the battery 2 to the electronic device. The power-supply wires (+) 3 and (−) 4 connect the power-supply terminals (+) 5 and (−) 11 from the positive terminal 13 and negative terminal 12 on both sides of the battery 2 and arrange the power-supply terminals (+) 5 and (−) 11 so as to close the distance therebetween. Furthermore, there are capacitors 8 connected to the negative terminal 12 and positive terminal 13 of the battery 2, and they connect to ground 10. The battery current 14 is direct current so it flows to the terminals without passing through the capacitors 8. On the other hand, a high-frequency current (noise component) 15 flows through the capacitors 8 to ground 10. Therefore, there is a reduction in the reflection of the high-frequency current (noise component) at the terminals, making it difficult for a standing wave whose wavelength corresponds to the length of the power-supply wire L55 to be generated, and it possible to control the radiated noise.

Figure 4:
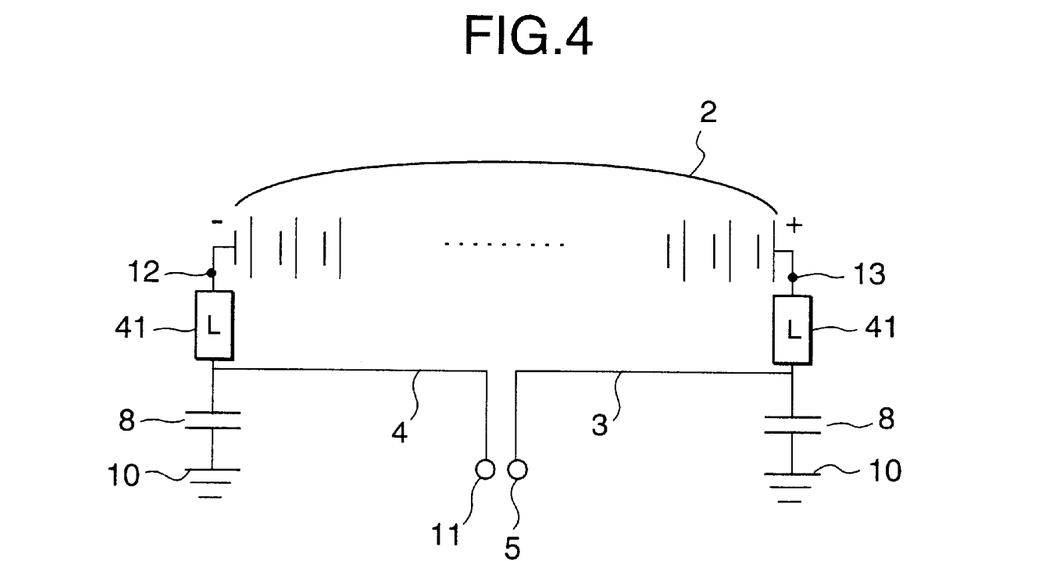
FIG. 4 is a drawing of the first embodiment constructed using a coil.

In addition, as shown in FIG. 4, it is possible to reduce noise by connecting coils 41 in series with negative terminal 12 and positive terminal 13 of the battery 2. At high frequency, the impedance of the coils 41 becomes higher than that of the capacitors 8, so the high-frequency current flowing to the terminals is reduced, and thus it is possible to reduce the reflection at the terminals. Therefore, a standing wave is hardly generated and it is possible to suppress the radiated noise.

Figure 2:
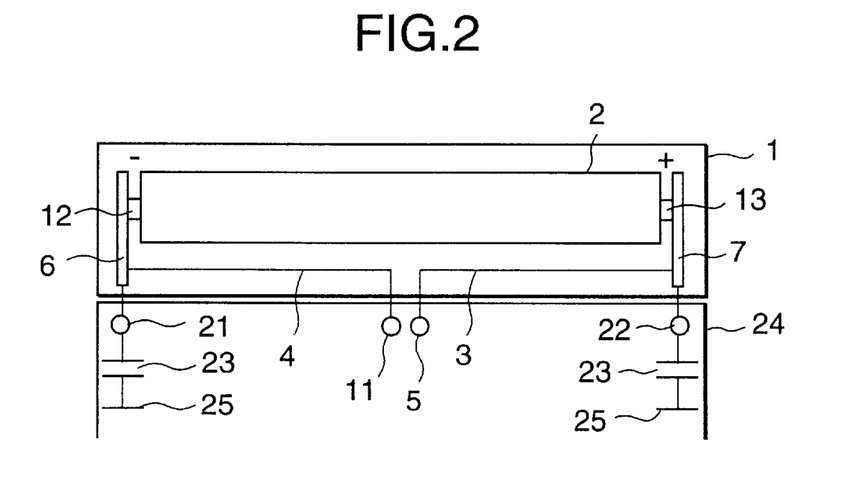
FIG. 2 is a drawing of the first embodiment constructed with a capacitor inside the notebook PC.

Next, FIG. 2 shows an example of applying the first embodiment to a notebook PC 24. The construction of the battery pack 1 shown in the figure comprises a battery 2, power-supply wire (+) 3, power-supply wire (−) 4, power-supply terminal (+) 5 and power-supply terminal (−) 11 for supplying current from the battery 2 to the notebook PC 24. The battery 2 is not limited to a single battery but can be constructed with a plurality of battery cell connected in series or parallel, and it comprises a positive terminal 13 and negative terminal 12. The connector 6 connects the negative terminal 12 and power-supply wire (−) 4, and the connector. 7 connects the positive terminal 13 and the power-supply wire (+) 3, and can be a fitting, metal plate, etc. Furthermore, the connectors 6 and 7 have connection terminals 21, 22, respectively, that connect to the notebook PC 24. There are capacitors 23 in the notebook PC 24, and they connect the connection terminals 21, 22 to ground 25 of the notebook PC 24 through the capacitors 23. It is desirable that the ground 25 is a common return wire with the signal (signal ground) on the board of the notebook PC 24. In this way, it is possible to construct a notebook PC 24 with battery pack 1 in which radiation noise is hardly generated.

Figure 11:
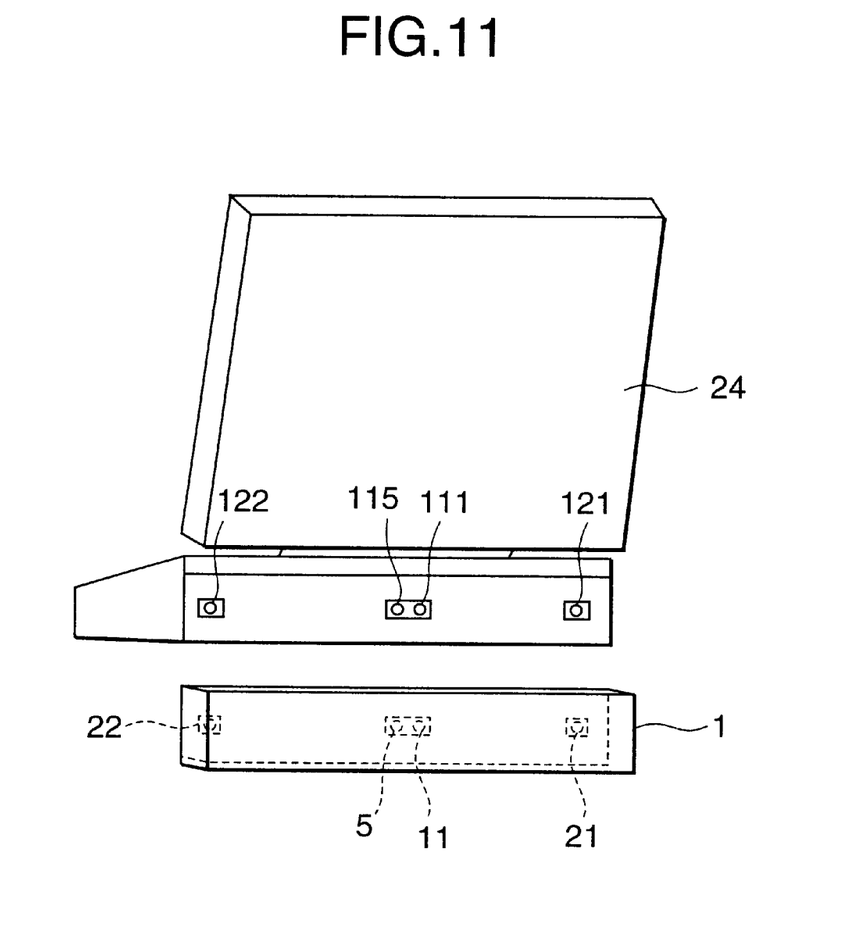
FIG. 11 is a general view showing the first embodiment of the present invention.

FIG. 11 is a general view of an example of the notebook PC 24 with battery pack 1. The battery pack 1 comprises connection terminals 21, 22, a power-supply terminal (+) 5 and power-supply terminal (−) 11. The notebook PC 24 comprises connection terminals 121, 122 that connect to the connection terminals 21, 22, and power-supply terminals 115, 111 that connect to the power-supply terminals (+) 5, (−) 11. In FIG. 11, only the electrical connection is shown, however, it is also possible to install means for a physical connection, such as fasteners or the like, and battery control signal wires.

Figure 3:
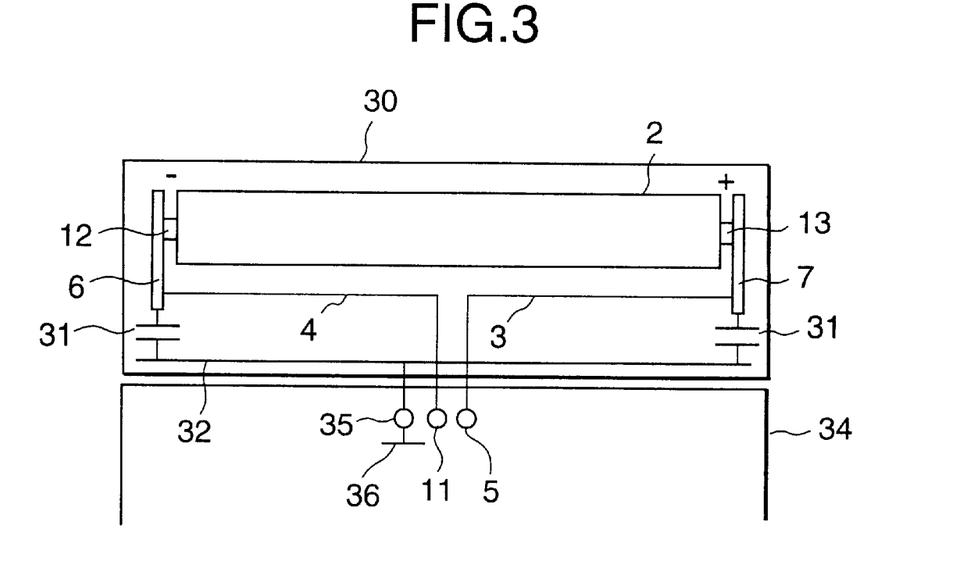
FIG. 3 is a drawing of the first embodiment constructed with a capacitor inside the battery.

Next, FIG. 3 shows an example of the battery pack 30 when capacitors are installed in the battery pack and notebook PC 34. The configuration of the battery pack 30 shown in this figure comprises a battery 2, power-supply wires (+) 3 and (−) 4, and power-supply terminals (+) 5 and (−) 11 for supplying current from the battery 2 to the notebook PC 34. Connector 6 connects the negative terminal 12 of the battery 2 with the power-supply wire (−) 4, and connector 7 connects the positive terminal 13 of the battery 2 with the power-supply wire (+) 3. Furthermore, the connector 6 and connector 7 connect to the ground 32 of the battery pack 30 through capacitors 31. The ground 32 of the battery pack 30 can be, for example, a conductive plate. Moreover, a terminal 35 connects the ground 32 of the battery pack 30 with the ground 36 of the notebook PC 34. In this way, it is possible to construct a notebook PC 34 with battery pack 30 in which radiated noise is hardly generated.

Figure 5:
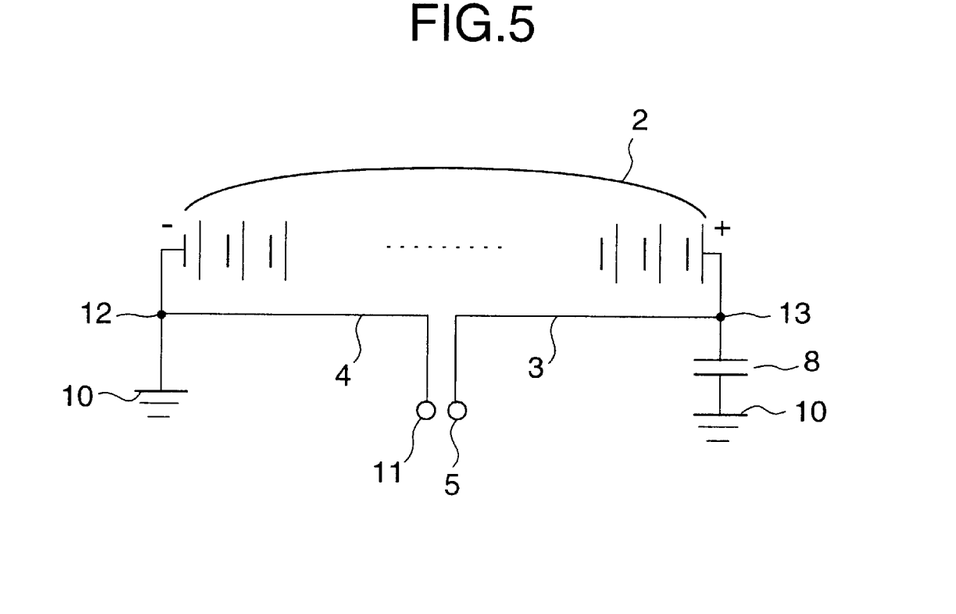
FIG. 5 is a drawing which explains a second embodiment of the present invention.

Next, FIG. 5 shows a second embodiment of the present invention in which a power-supply wire (−) 4 is connected directly to ground 10 without the use of a capacitor. A power-supply wire (+) 3 connect to ground 10 through a capacitor 8 in the same way as in the first embodiment shown in FIG. 1. In this way as well, high-frequency current (noise component) flows to ground 10 so that it is possible to reduce the reflection at the terminals, and it is possible to suppress radiated noise that is caused by generation of standing waves.

Figure 6:
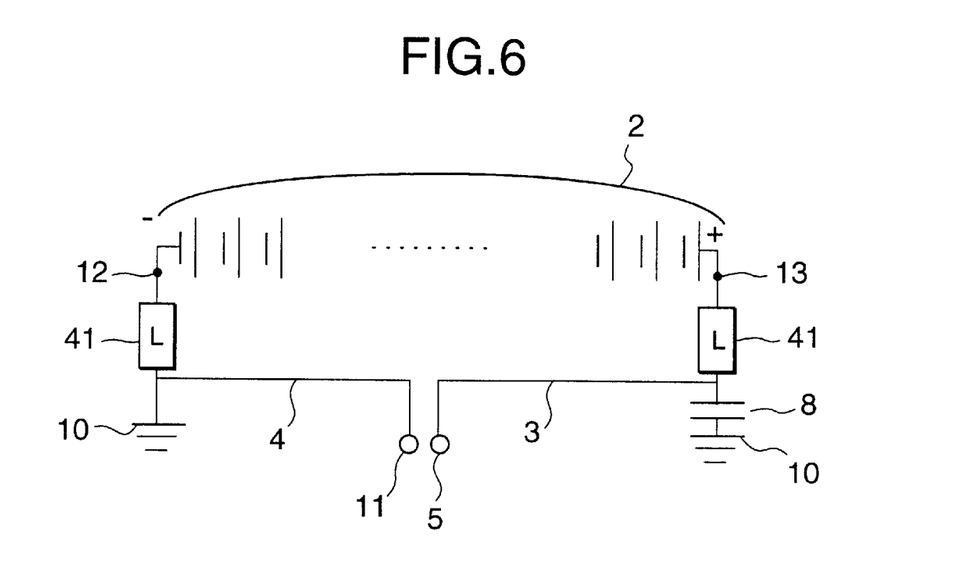
FIG. 6 is a drawing of the second embodiment constructed using a coil.

Furthermore, as shown in FIG. 6, it is also possible to install coils 41 at the negative terminal 12 and positive terminal 13 of the battery 2. For high frequency, the impedance of the coils 41 is higher than that of the capacitor 8, so it is possible to reduce the high-frequency current that flows in the terminals, as well as reduce the reflection at the terminals. Therefore, it is possible to suppress the radiated noise that is caused by generation of standing waves.

Figure 7:
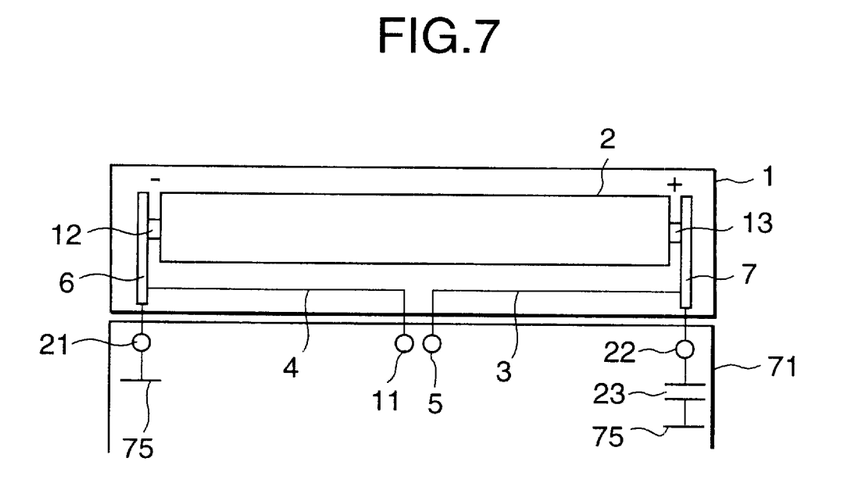
FIG. 7 is a drawing of the second embodiment constructed with a capacitor inside the notebook PC.

Next, FIG. 7 shows an example of applying the second embodiment in a notebook PC 71. A capacitor 23 is located in the notebook PC 71, the connection terminal 22 connects to the ground 75 of the notebook PC 71 through the capacitor 23, and the connection terminal 21 connects directly to the ground 75 of the notebook PC 71. In addition, by connecting the battery pack 1, which was explained in the example of applying the first embodiment to the notebook PC 24, to the notebook PC 71, it is possible to construct a notebook PC 71 with battery pack 1 in which radiated noise is hardly generated.

Figure 8:
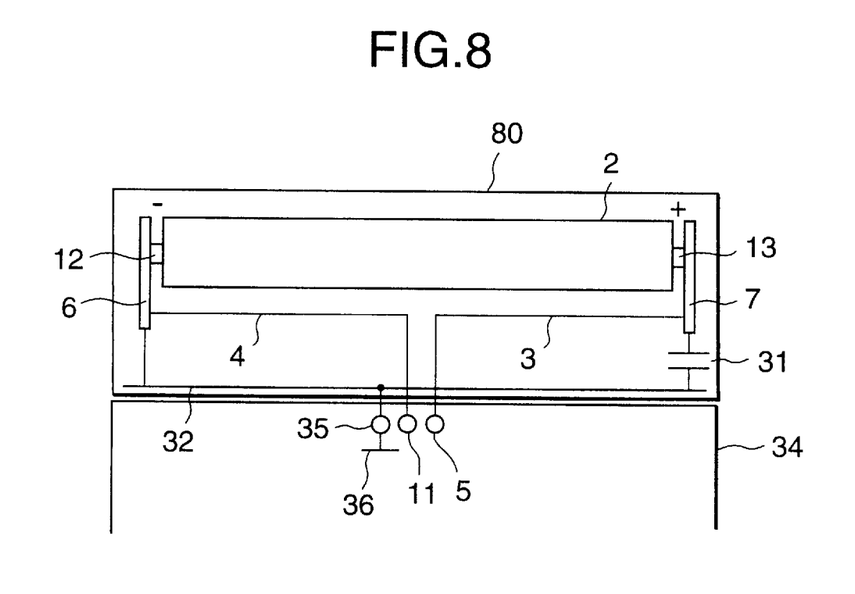
FIG. 8 is a drawing of the second embodiment constructed with a capacitor inside the battery.

Furthermore, it is also possible to install a capacitor inside the battery pack 80 (see FIG. 8). The connector 6 connects the negative terminal 12 of the battery 2 with the power-supply wire (−) 4, and the connector 7 connects the positive terminal 13 of the battery 2 with the power-supply wire (+) 3. In addition, a capacitor 31 is installed so that the connector 7 is connected to the ground 32 of the battery pack 80 through the capacitor 31, while the connector 6 is connected directly to the ground 32 of the battery pack 80. Also, the ground 32 of the battery pack 80 is connected to the ground 36 of the notebook PC 34 through the connection terminal 35. In this way, it is possible to construct a notebook PC 34 with battery pack 80 in which radiated noise is hardly generated.

Figure 9:
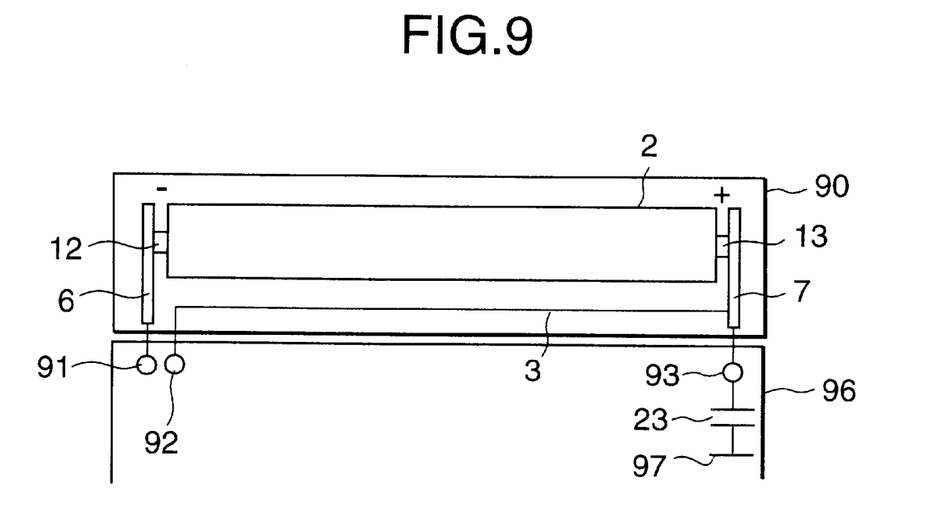
FIG. 9 shows an example of applying the second embodiment to a battery pack which has a power-supply wire on one of the battery terminals.

Moreover, it is possible to locate the power-supply terminal for supplying current from the battery to the notebook PC near one of the battery terminals instead of in the center of the battery pack. For example, FIG. 9 shows an example of a battery pack 90 in which the both the positive and negative power-supply terminals are located near the negative terminal of the battery 2. The power-supply terminals (−) 91 and (+) 92 are located near the negative terminal 12 of the battery 2, and the connection terminal 93 is located at the connector 7. Also, it is possible to arrange a capacitor 23 inside the notebook PC 96 and to connect the connection terminal 93 to the ground 97 of the notebook PC 96 through the capacitor 23. In this example, the power-supply terminals (−) 91, (+) 92 are located near the negative terminal 12, however it is also possible to locate them on the side of the positive terminal 13. Also, it is possible to locate the capacitor 23 inside the battery pack 90.

Figure 10:
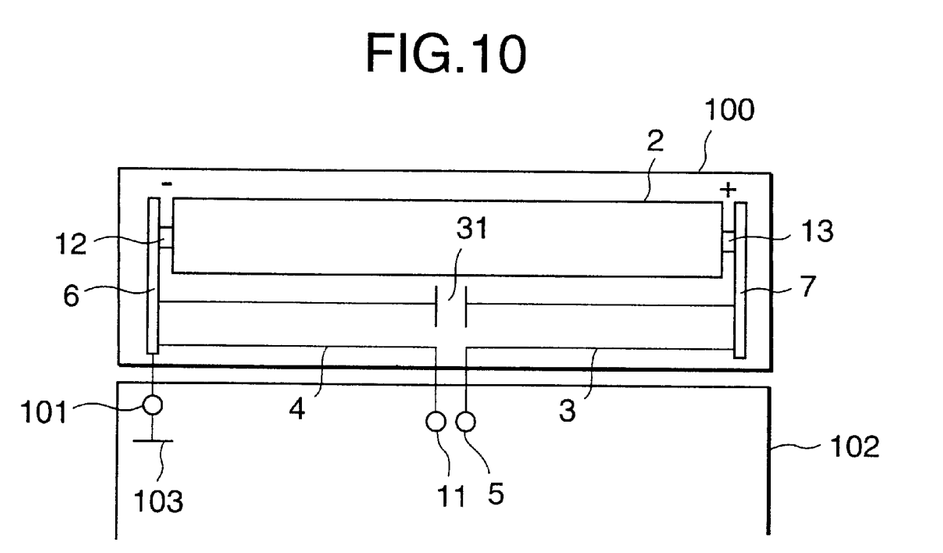
FIG. 10 is a drawing of the second embodiment constructed such that a positive terminal and a negative terminal of the battery are connected by way of a capacitor.

It is further possible to connect the positive terminal and the negative terminal of the battery by a capacitor. FIG. 10 shows an example of a battery pack 100 in which the positive terminal 13 and the negative terminal 12 are connected by a capacitor 31. The connectors 6 and 7 of the battery terminals 12, 13 are connected by the capacitor 31, and a connection terminal 101 is located at the connector 6 which is connected to the negative terminal 12 of the battery 2. This connection terminal 101 connects to the notebook PC 102, and can be connected to the ground 103 of the notebook PC 102. In this example, the connection terminal 101 is located at the connector 6, however it is also possible to locate it at the connector 7.

It is also possible to place the capacitor 31 inside the notebook PC 102. The power-supply terminals (−) 11, (+) 5 are connected via the capacitor 31 installed in the notebook PC 102. The connection terminal connects to the ground of the notebook PC 101.

Figure 14:
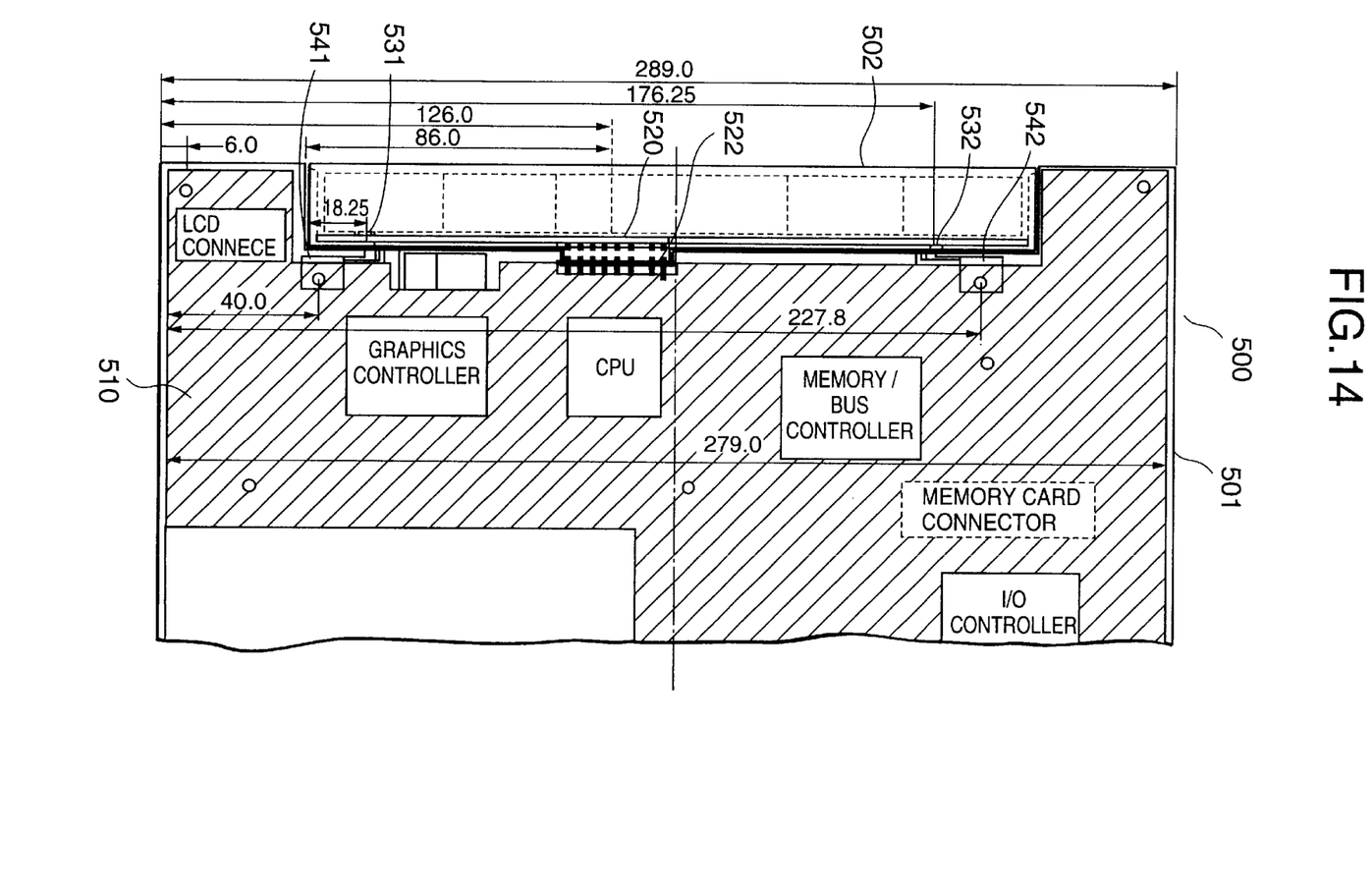
FIG. 14 is a diagram showing the connected state of the notebook PC and the battery.

Next, FIGS. 14 through 20 will be used to explain the application of a third embodiment to a notebook PC. FIG. 14 shows the state of a battery pack 502 mounted to a notebook PC 500. The notebook PC 500 of this embodiment is a portable type with a width of 283 mm and depth of 235 mm, and the battery pack 502 is mounted to the outside of the PC body 501 through power-supply connectors 520 and 522. Moreover, the ground of the circuit board 510 of the notebook PC 500 is connected to the ground of the battery pack 502 through the ground connection fittings 531 and 532 on the battery pack 502, and the ground connection fittings 541 and 542 on the PC 500.

Figure 15:
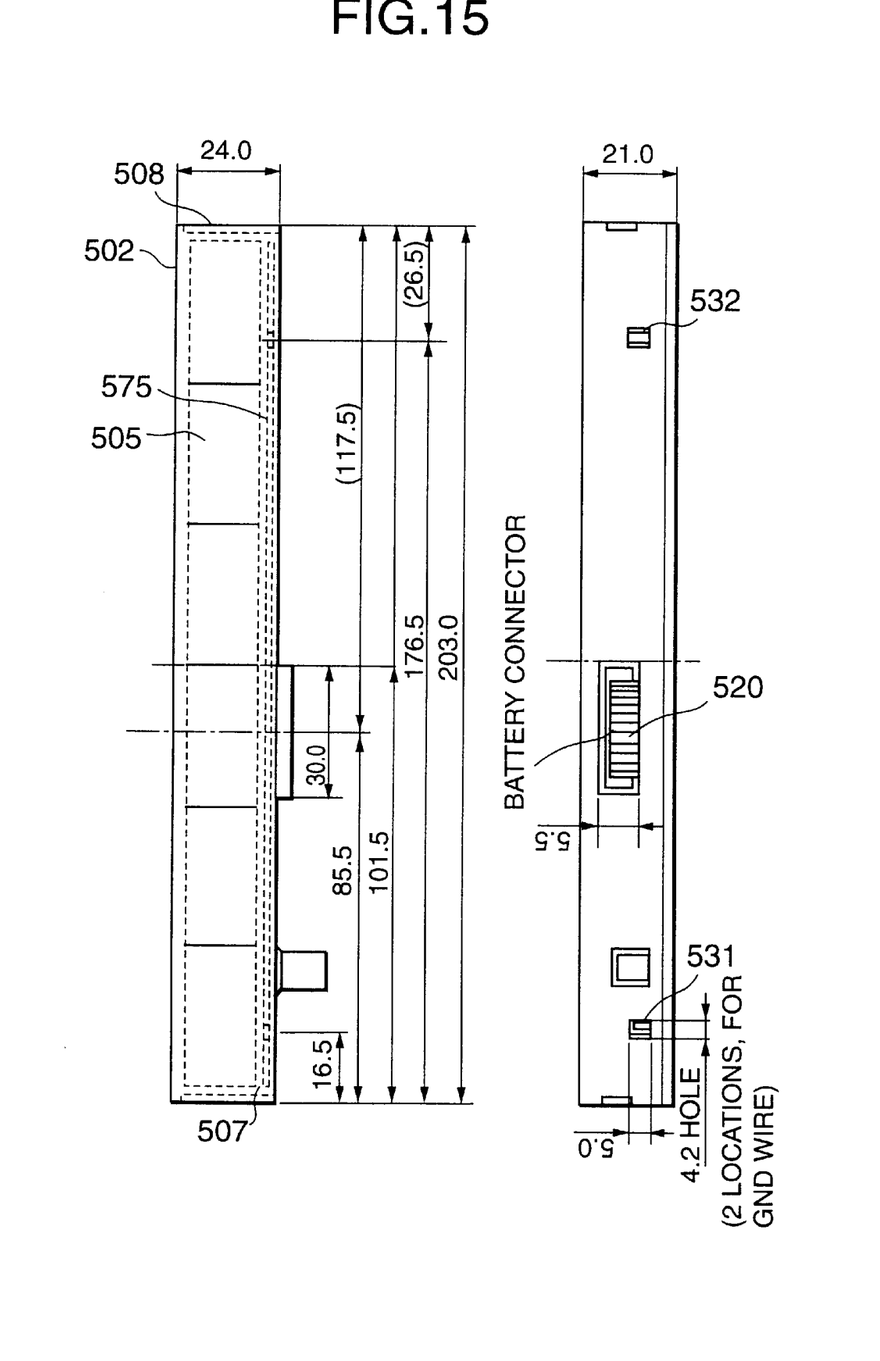
FIG. 15 is an exterior view of the battery pack.

FIG. 15 shows the shape of the battery pack 502. The battery pack 502 is constructed so as to hold six secondary rechargeable batteries 505, and a secondary rechargeable battery power supply and control board 575, and it is nearly rectangular solid with a length L of 203 mm, depth of 24 mm and height of 21 mm. This battery pack 502 has a power-supply connector 520 which is located at almost center and at 85.5 mm from the end of the battery pack. In order to prevent poor connection due to only one side being connected, the power-supply connector 520 is located around the center of the battery pack 502 so that the battery pack can be held by the guides 507, 508 on the side of the board and by the power-supply connector 520. Also, at positions 16 mm ($16/203 < 1/5$) and 26.5 mm ($26.5/203 < 1/5$) from the end of the battery pack 502, or in other words, at a position from both ends of the battery pack 502 at a distance of $1/5$ or less the full length of the battery pack 502, there are ground connection fittings 531 and 532 which connect electrically to the ground of the secondary rechargeable battery power supply and control board 575. These connection fittings 531, 532 are formed in a protruding shape from a thin spring-like plate such as phosphor bronze. Therefore, it is possible to minimize the connection resistance between them and the connecting surface with the ground connection fittings 541 and 542 of the PC 500, and thus the connection has low impedance even in the high frequency range.

Figure 16:
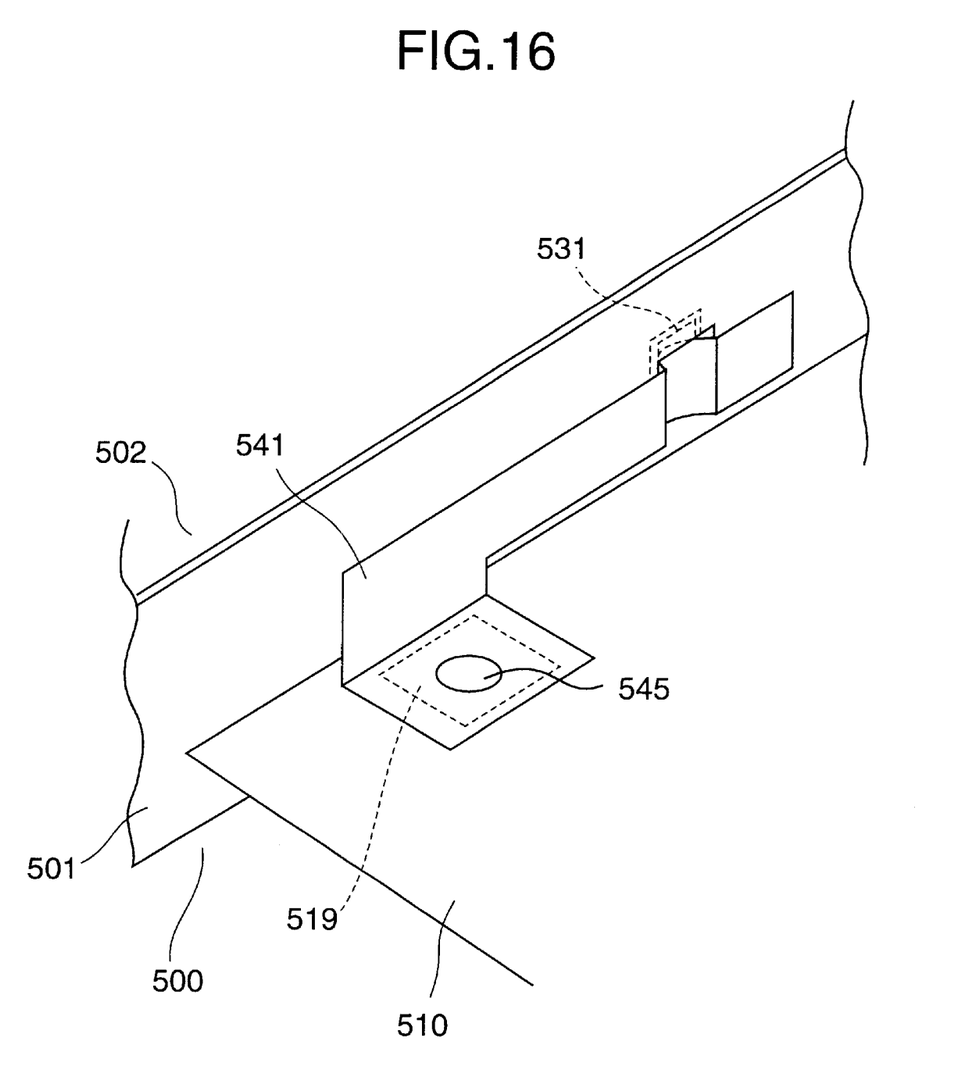
FIG. 16 is a diagram showing the installation of the ground connection fittings on the PC side.

FIG. 16 shows the installation state of the ground connection fitting 541 of PC 500. The ground connection fitting 541 is fastened to the PC circuit board 510 at the screw hole 545. When fastening it, there is a ground pad 519 in the screw hole 545 on the side of the PC circuit board 510, and by fastening the circuit board 510 to the ground connection fitting 541 with a screw, it is possible to connect the circuit board 510 with the ground connection fitting 541 so that there is low impedance even in the high frequency range. Also, the ground connection fitting 541 can be a thin spring-like plate such as phosphor bronze as in the case of the ground connection fittings 531, 532 of the battery, and the end is formed in a protruding circular shape. The protruding circular shaped section is formed so that it sticks out of the window formed in the body 501 of the PC 500. With this kind of structure, the protruding circular shaped section is pressed against and comes in contact with the ground connection fitting 531 of the battery, when the battery pack 502 is installed, making it possible to connect the circuit board 510 of the PC 500 and the secondary rechargeable battery power supply and control board 575 of the battery pack 502 with low impedance even in the high frequency range.

Figure 17:
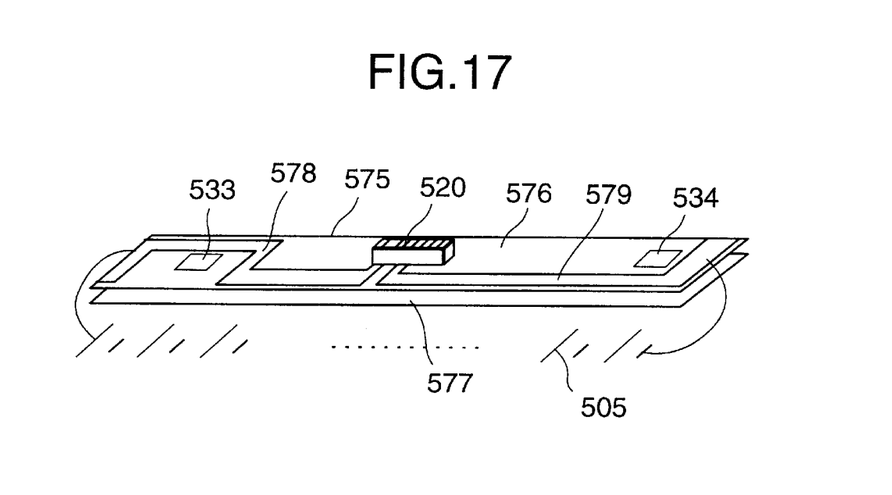
FIG. 17 is a diagram showing the construction of the secondary battery charging power supply and control substrate inside the battery pack.

FIG. 17 shows the wiring of the secondary rechargeable battery power supply and control board 575 of the battery pack 502. The board 575 is a two-layered board with a signal wiring layer 576 and ground layer 577. The wire 578 for the positive terminal and the wire 578 for the negative terminal are wired on the signal wiring layer 576 from the power-supply connector 520. The wire 578 for the positive terminal and the wire 579 for the negative terminal connect to the secondary rechargeable battery 505. Also, on the board 575, there are ground pads 533, 534 for connecting the ground connection fittings 531 and 532. The ground layer 577 functions as the reference potential for the circuits for battery control located on the board, so it has a planar shape.

Figure 18:
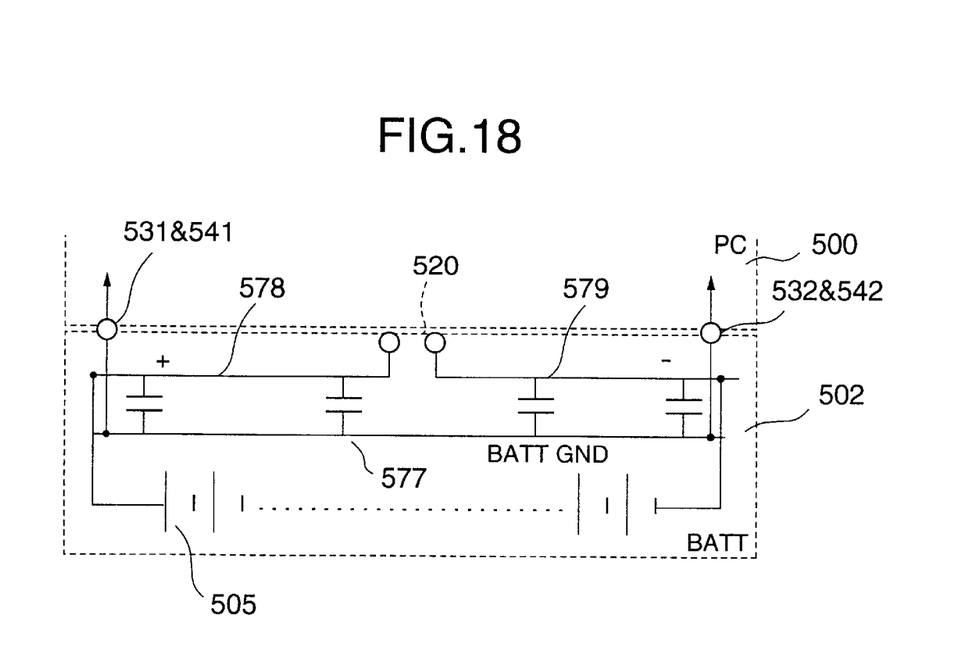
FIG. 18 is a diagram showing the noise reduction theory of a third embodiment.

FIG. 18 shows a noise generation model of the battery pack 502. The wire 578 for the positive terminal and the wire 579 for the negative terminal shown in FIG. 17 are wired in opposite directions on the left and right and supply power to the positive and negative terminals of the secondary rechargeable battery 505, respectively, and when the construction is not that of this invention, they form a half-wavelength dipole antenna and become a source of radiated noise. On the other hand, the ground layer 577 is connected with low impedance to the ground of the PC through the pads 533, 534. Also, the wire 578 for the positive terminal and the wire 579 for the negative terminal have micro stripwire construction and with the ground layer 577 of the planar construction, and the wire 578 for the positive terminal and the wire 579 for the negative terminal have a capacitive coupling with the ground layer 577. Generally, large current flows through the wire 578 for the positive terminal and the wire 579 for the negative terminal and are made of wide wire, so the capacitance between the terminal wires 578, 579 and the ground layer 577 is sufficiently large, and both are coupled with low impedance in high frequency. Therefore, it is possible for the terminal wires 578, 579 and the PC ground to be coupled with low impedance even in the high-frequency range. In this way, the noise that emerges from the power-supply connector 520 is reduced through the ground connection (531-541, 532-542).

Figure 19:
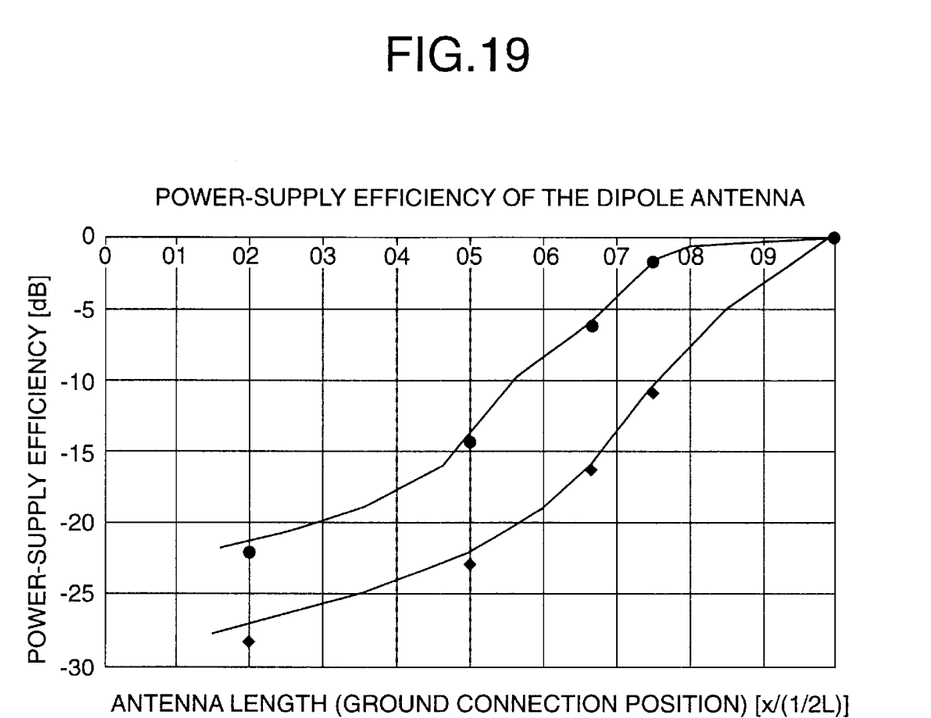
FIG. 19 is a graph showing the relationship between the antenna length of the dipole antenna and the power-supply efficiency.

Next, FIG. 19 shows the measurement results of the radiation efficiency at two frequencies for the noise component that does not return to the PC from the ground connection (531-541, 532-542). The upper graph shows the result in a low frequency and the lower graph shows the result in a high frequency. The vertical axis of this graph shows the radiated power in decibels when the antenna length is changed, based on the radiated power of a half-wavelength dipole antenna as a reference. The horizontal axis of the graph is the length ratio, with half the length of the battery pack ½L taken as being 1. The value of the power of the ideal dipole antenna is used as the calculated value of this radiated power. The value of the radiated power differs depending on the surface skin depth at the target frequency, so in the graph shown in FIG. 19, there is a gap in the values of the radiated power. When the ground connection (531-541, 532-542) position is ¼ the length of the battery pack (0.5 on the X axis), the radiation efficiency drops to −20 dB in the worst case, however there is no problem on the outside of the ground connection (531-541, 532-542) position, even if becoming an antenna.

Moreover, with respect to the standing waves that are generated in the terminal wires 578, 579, since they are connected to ground at the points of the pads 533, 534, the waveform becomes a node at this point, and waves whose wavelength are ⅕ or less than the basic wave (the frequency is 5×) becomes the main component. However, in the case of trapezoidal waves that are used in digital circuits, since there is large damping for a wavelength less than ⅕ the basic wave, there is little effect from noise radiation from ⅕ wavelengths.

Figure 20A:
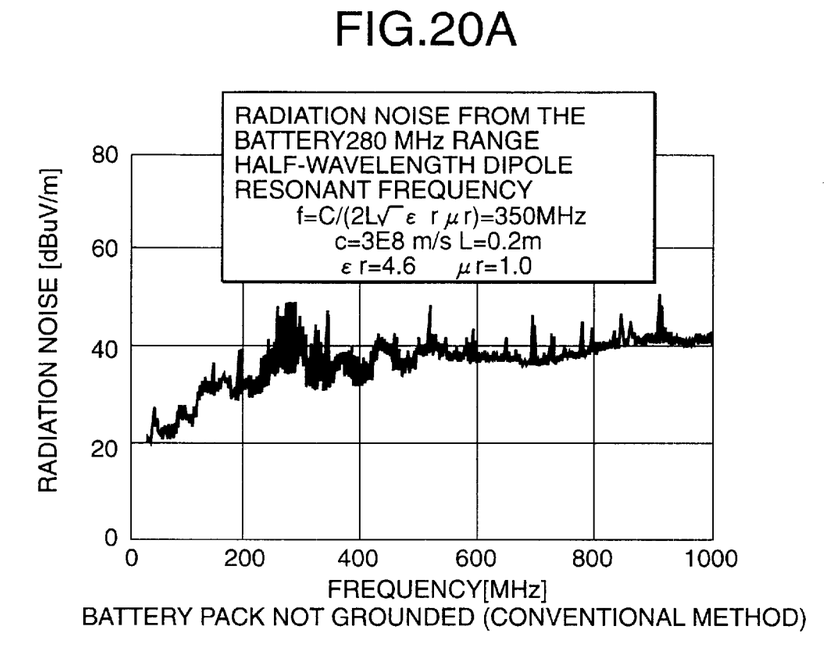
FIGS. 20A and 20B are diagrams showing the noise reduction effect according to the present invention.
Figure 20B:
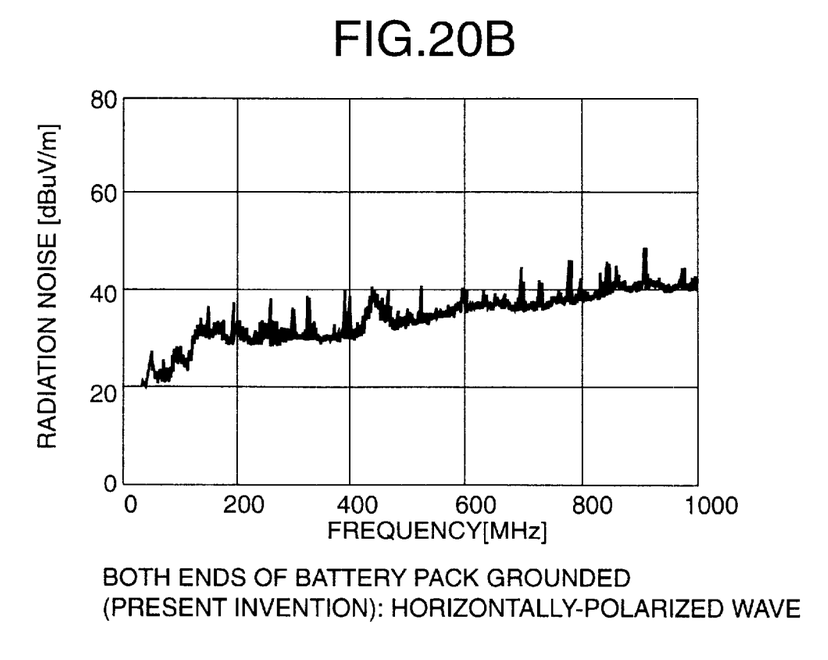

FIG. 20 shows the results of measuring the effect of actually using this invention in a trial machine. The size of the battery pack is the same as the one shown in FIG. 15, and the method of installing it in the PC and its construction are the same as those shown in FIG. 14. FIG. 20A shows the results of measuring noise radiated from a conventional battery pack whose ends are not grounded, with the 3-meter method in an electromagnetic darkroom. Also, FIG. 20B shows the results of measuring noise radiated from a battery pack constructed according to the present invention in which the ends are grounded, with the 3-meter method in an electromagnetic darkroom. From these results it was confirmed that in the case of not using the present invention, the radiated noise was at a peak at approximately 300 MHz near the resonant frequency of the antenna whose wavelength is half the length of the battery pack (resonant frequency is 350 MHz for a battery pack length of 0.2 m and dielectric constant of 4.6), whereas, when constructed using the present invention, there was hardly any radiated noise in the 300 MHz range. From these results, it can be seen that by using the construction of this invention, it is possible to reduce the 15 to 20 dB noise.

By making a ground connection (531-541, 532-542) and connecting the circuit board 510 of the PC 500 with low impedance, standing waves are hardly generated. In addition, by connecting to ground at a position ¼ to ⅕ the length of the battery pack from the end of the battery pack, it is possible to make an antenna with poor radiation efficiency and to reduce the noise. Furthermore, it is possible to reduce noise by changing basic digital signal waves in the high frequency range in which it is easy for radiated noise to occur to higher harmonics with large damping.

With this invention, by grounding the battery terminals with a capacitive element, it is possible to provide an information processing device that is capable of being operated by battery, in which the generation of standing waves that occur between the battery terminals is controlled and the radiated noise is reduced.

What is claimed is:

1. An information processing device in which a battery pack is detachably/attachably mounted, said battery pack accommodating a battery which supplies power to said information processing device, said information processing device comprising:

a first signal line which connects a terminal of a positive pole of said battery to a terminal of a positive pole of a main body of said information processing device; and a second signal line which connects a terminal of a negative pole of said battery to a terminal of a negative pole of said main body of said information processing device, wherein said first signal line has a first branch line which connects said terminal of the positive pole of said battery to a ground of said main body of said information processing device, said second signal line has a second branch line which connects said terminal of the negative pole of said battery to the ground of said main body of said information processing device, at least one of said first branch line and said second branch line is connected to the ground of said main body of said information processing device through at least one capacitive element, and said at least one capacitive element is provided at a side of said terminal of said positive pole of said battery on said first signal line or a side of said terminal of said negative pole of said battery on said second signal line.

2. The information processing device according to claim 1, wherein
said first branch line is connected to the ground of said information processing device through said at least one capacitive element, and
said second branch line is connected to the ground of said information processing device without said at least one capacitive element.

3. The information processing device according to claim 1, further comprising a capacitive element which is provided between the terminal of the negative pole and the terminal of the positive pole of the battery so that the terminal of the negative pole and the terminal of the positive pole are connected electrically by the capacitive element.

4. The information processing device according to claim 1, wherein
said at least one capacitive element is provided at an antinode position of a standing wave generated in said first signal line or said second signal line so as to suppress the standing wave.

5. The information processing device according to claim 1, wherein
said at least one of said first branch line and said second branch line is connected to the terminal of said battery through at least one inductive element.

6. The information processing device according to claim 1, wherein the capacitive element is provided on a unit for connecting a battery electrode and a signal wire.

7. A battery pack for accommodating a battery which supplies power to an information processing device, said battery pack comprising:
a first signal line which connects a terminal of a positive pole of said battery to a terminal of a positive pole of said information processing device;
a second signal line which connects a terminal of a negative pole of said battery to a terminal of a negative pole of said information processing device, wherein
said first signal line has a first branch line which connects said terminal of the positive pole of said battery to a ground of said information processing device,
said second signal line has a second branch line which connects said terminal of the negative pole of said battery to the ground of said information processing device,
at least one of said first branch line and said second branch line is connected to the ground of said information processing device through at least one capacitive element, and
said at least one capacitive element is provided at a side of said terminal of said positive pole of said battery on said first signal line or a side of said terminal of said negative pole of said battery on said second signal line.

8. The battery pack according to claim 7, further comprising a capacitive element between the terminal of the negative pole and the terminal of the positive pole of the battery so that the terminal of the negative pole and the terminal of the positive pole are connected electrically by the capacitive element.

9. The battery pack according to claim 7, wherein
said at least one of said first branch line and said second branch line is connected to the terminal of said battery through at least one inductive element.

10. The information processing device according to claim 7, wherein the capacitive element is provided on a unit for connecting a battery electrode and a signal wire.

11. The information processing device comprising a battery pack which accommodates a battery for supplying power to a main body of said information processing device, wherein:
said battery pack comprises a power-supply connection unit which has terminals of a positive pole and a negative pole, and ground connection units located between ends of said battery pack and said power-supply connection unit, and wherein
said ground connection units are located at a distance having about ¼ of length of said battery pack from ends of said battery pack.

12. An information processing device comprising a battery pack which accommodates a battery for supplying power to a core of said information processing device, wherein
said battery pack comprises a power-supply connection unit which has terminals of a positive pole and a negative pole, and ground connection units located between ends of said battery pack and said power-supply connection unit, and wherein
said ground connection units are located at a distance having about ⅓ of length of said battery pack from ends of said battery pack.

13. An information processing device in which a battery pack is detachably/attachably mounted, said battery pack accommodating a battery which supplies power to said information processing device, said information processing device comprising:
a first signal line which connects a terminal of a positive pole of said battery to a terminal of a positive pole of a main body of said information processing device; and
a second signal line which connects a terminal of a negative pole of said battery to a terminal of a negative pole of the main body of said information processing device, wherein
each of said first signal line and said second signal line has a first connection point,
one of said first signal line and said second signal line has a second connection point,
said first connection points of said first signal line and said second signal line are electrically connected each other through a capacitive element, and
said second connection point is connected to a signal wire which connects a power-supply terminal of said information processing device and a signal wire which connects a ground of said information processing device.

14. A battery pack for accommodating a battery which supplies power to an information processing device, said battery pack comprising:
a first signal line which connects a terminal of a positive pole of said battery to a terminal of a positive pole of a main body of said information processing device; and
a second signal line which connects a terminal of a negative pole of said battery to a terminal of a negative pole of the main body of said information processing device, wherein
each of said first signal line and said second signal line has a first connection point,
one of said first signal line and said second signal line has a second connection point,
said first connection points of said first signal line and said second signal line are electrically connected each other through a capacitive element, and
said second connection point is connected to a signal wire which connects a power-supply terminal of said information processing device and a signal wire which connects a ground of said information processing device.

* * * * *